(12) United States Patent
Long et al.

(10) Patent No.: US 11,411,632 B2
(45) Date of Patent: Aug. 9, 2022

(54) METHOD TO ESTIMATE SNR FOR MU-MIMO BASED ON CHANNEL ORTHOGONALITY

(71) Applicant: Telefonaktiebolaget LM Ericsson (publ), Stockholm (SE)

(72) Inventors: Jianguo Long, Kanata (CA); Mats Åhlander, Täby (SE); Chandra Sekhar Bontu, Nepean (CA); Yongquan Qiang, Ottawa (CA); Hong Ren, Kanata (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 71 days.

(21) Appl. No.: 16/976,207

(22) PCT Filed: Feb. 28, 2019

(86) PCT No.: PCT/IB2019/051636
§ 371 (c)(1),
(2) Date: Aug. 27, 2020

(87) PCT Pub. No.: WO2019/166995
PCT Pub. Date: Sep. 6, 2019

(65) Prior Publication Data
US 2021/0006316 A1    Jan. 7, 2021

Related U.S. Application Data

(60) Provisional application No. 62/636,723, filed on Feb. 28, 2018.

(51) Int. Cl.
*H04B 7/06* (2006.01)
*H04B 17/336* (2015.01)
*H04B 7/0452* (2017.01)

(52) U.S. Cl.
CPC ......... *H04B 7/0632* (2013.01); *H04B 7/0452* (2013.01); *H04B 7/0617* (2013.01); *H04B 17/336* (2015.01)

(58) Field of Classification Search
CPC .. H04B 7/0632; H04B 7/0452; H04B 7/0617; H04B 17/336
See application file for complete search history.

(56) References Cited

U.S. PATENT DOCUMENTS

| | | | |
|---|---|---|---|
| 8,259,672 B2 * | 9/2012 | Hochwald | ............ H04B 7/0617 370/331 |
| 9,338,686 B2 | 5/2016 | Zubow et al. | |

(Continued)

OTHER PUBLICATIONS

Author Unknown, "Technical Specification Group Radio Access Network; Evolved Universal Terrestrial Radio Access (E-UTRA); Physical layer procedures (Release 14)," 3GPP TS 36.213, Version 14.0.0, Sep. 2016, 406 pages.

(Continued)

*Primary Examiner* — Minh Trang T Nguyen
(74) *Attorney, Agent, or Firm* — Sage Patent Group (57) ABSTRACT

Systems and methods for estimating Signal-to-Noise Ratio (SNR) for Multi-User Multiple-Input and Multiple-Output (MU-MIMO) based on channel orthogonality. In some embodiments, a method performed by a radio access node includes obtaining a SU-MIMO signal quality measurement for at least a first user and an additional user; obtaining an indication of orthogonality between a channel of the first user and a channel of the additional user; and estimating a MU-MIMO signal quality measurement for the first user as if the first user and the additional user are paired with each other for a potential MU-MIMO transmission based on the SU-MIMO signal quality measurements and the indication of orthogonality. In this way, a computational complexity for the SINR estimation of MU-MIMO users can be greatly (Continued)

reduced. This may enable a large number of user pairing alternatives to be evaluated in practical wireless systems to achieve improved MU-MIMO performance.

31 Claims, 8 Drawing Sheets

(56) References Cited

U.S. PATENT DOCUMENTS

2014/0369220 A1  12/2014  Fan et al.
2016/0134342 A1  5/2016  Kneckt et al.

OTHER PUBLICATIONS

Author Unknown, "Technical Specification Group Radio Access Network; Evolved Universal Terrestrial Radio Access (E-UTRA); Physical layer procedures (Release 14)," 3GPP TS 36.213, Version 14.5.0, Dec. 2017, 462 pages.
Author Unknown, "Technical Specification Group Radio Access Network; NR; Physical layer procedures for data (Release 15)," 3GPP TS 38.214, Version 2.0.0, Dec. 2017, 71 pages.
Author Unknown, "Technical Specification Group Radio Access Network; NR; Physical layer procedures for data (Release 15)," 3GPP TS 38.214, Version 15.0.0, Dec. 2017, 71 pages.
Björnson, E., et al., "Optimal Multiuser Transmit Beamforming: A Difficult Problem with a Simple Solution Structure," IEEE Signal Processing Magazine, vol. 31, Issue 4, Jul. 2014, pp. 142-148.
Dhakal, S., et al., "Statistical Analysis of User-pairing Algorithms in Virtual MIMO Systems," Wireless Telecommunications Symposium (WTS), Apr. 21-23, 2010, 5 pages.
Nokia, "Tdoc RP-172416: Presentation of Specification to TSG: TS38 214, Version 2 0.0," 3GPP TSG-RAN Meeting #78, Lisbon, Portugal, Dec. 18-21, 2017, 1 page.
Shannon, C. E., "Communication in the Presence of Noise," Proceedings of the Institute of Radio Engineers, vol. 37, Issue 1, Jan. 1949, pp. 10-21.
Shannon, C. E., "Communication in the Presence of Noise," Proceedings of the IEEE, vol. 86, No. 2, Feb. 1998, pp. 447-457.
International Search Report and Written Opinion for International Patent Application No. PCT/IB2019/051636, dated May 14, 2019, 18 pages.

* cited by examiner

METHOD TO ESTIMATE SNR FOR MU-MIMO BASED ON CHANNEL ORTHOGONALITY

RELATED APPLICATIONS

This application is a 35 U.S.C. § 371 national phase filing of International Application No. PCT/IB2019/051636, filed Feb. 28, 2019, which claims the benefit of provisional patent application Ser. No. 62/636,723, filed Feb. 28, 2018, the disclosures of which are hereby incorporated herein by reference in their entireties.

TECHNICAL FIELD

The disclosed subject matter relates generally to telecommunications. Certain embodiments relate more particularly to concepts such as estimating Signal-to-Noise Ratio (SNR).

BACKGROUND

In wireless communications, Multiple-Input and Multiple-Output (MIMO) technology is becoming more and more popular and has been incorporated into wireless broadband standards like Wi-Fi, Long Term Evolution (LTE), and Fifth Generation (5G). Multi-User MIMO (MU-MIMO) allows one wireless device or user to communicate with multiple devices or users simultaneously using the same time frequency resource. In contrast, Single-User MIMO (SU-MIMO) considers a single multi-antenna transmitter communicating with a single multi-antenna receiver. MU-MIMO can leverage multiple users as spatially distributed transmitters or receivers and has an outstanding performance advantage over SU-MIMO.

In Fourth Generation (4G) LTE and 5G networks, MU-MIMO can be either downlink or uplink. In downlink MU-MIMO, a single sender, enhanced or evolved nodeB (eNB) or New Radio nodeB (gNB), transmits to multiple receivers, i.e., User Equipments (UEs), over the same time frequency resource. Examples of advanced transmit processing for downlink MU-MIMO are interference aware precoding and Space-Division Multiple Access (SDMA)-based downlink user scheduling. Conversely, uplink MU-MIMO represents a case in which the multiple senders, i.e., UEs, send to a single receiver, i.e., eNB or gNB. Examples of advanced receive processing for uplink MU-MIMO are joint interference cancellation and SDMA-based uplink user scheduling.

It is well known that the performance of any MIMO system is limited by the presence of inter-layer or inter-user interference. The spectral efficiency gain in any MU-MIMO system can be enhanced by selecting users so that minimal inter-user interference is achieved. Inappropriate user pairing may in fact degrade the performance of MU-MIMO systems to below that of SU-MIMO transmission.

A user-pairing algorithm for MU-MIMO is generally defined as follows: among all active users, select one or more users $u_n$, n=0, 1, . . . , N−1, to increase MIMO gain, i.e., to maximize the joint channel capacity. In the process of searching for the optimal solution for user pairing, the joint capacity for each possible combination of users is calculated, and the combination which maximizes the joint channel capacity of multiple selected users is selected.

It is well known that the capacity of a communication channel is conditioned on the Signal-to-Noise Ratio (SNR) and channel bandwidth according to Shannon-Hartley theorem. Additional details can be found in: C. E. Shannon (January 1949), "Communication in the presence of noise". Proceedings of the Institute of Radio Engineers. 37 (1): 10-21.

As channel bandwidth is usually fixed in wireless systems, the main processing in joint channel capacity estimation is therefore the estimation of SNR or more general, Signal-to-Interference-and-Noise Ratio (SINR) for users when multiple users are paired together. Once the user pairing is determined, the SINR estimates for the paired users can also be used in subsequent link adaptation. Hence a fast and accurate SINR estimation method is very important for MU-MIMO implementation in practical large scale wireless systems.

There currently exist certain challenge(s). To improve the performance of a wireless network, several multiple antenna techniques such as spatial multiplexing and beamforming are always jointly used with multi-user MIMO technique in wireless MIMO systems. These multiple antenna techniques can be modeled as either precoding or post-coding in a wireless system.

In a user-pairing evaluation process, conventional methods for SINR estimation of MU-MIMO users need the precoding and/or post-coding weights and for all possible combinations of users. The calculation of precoding/post-coding weights in general needs complicated algorithms and has high computational complexity. Furthermore, in a practical wireless system, the number of active users could be larger. Consequently, the number of combinations of users in user-pairing is also large. To evaluate a large number of possible user-pairing alternatives, a fast and generic algorithm with reduced complexity is needed.

SUMMARY

Systems and methods for estimating Signal-to-Noise Ratio (SNR) for Multi-User Multiple-Input and Multiple-Output (MU-MIMO) based on channel orthogonality are provided herein. In some embodiments, a method is performed by a radio access node for estimating signal quality for users in a MU-MIMO system. The method includes obtaining a Single-User MIMO (SU-MIMO) signal quality measurement for at least a first user and an additional user; obtaining an indication of orthogonality between a channel of the first user and a channel of the additional user; and estimating a MU-MIMO signal quality measurement for the first user as if the first user and the additional user are paired with each other for a potential MU-MIMO transmission based on the SU-MIMO signal quality measurement for the first user and the additional user and the indication of orthogonality. In this way, a computational complexity for the Signal-to-Interference-and-Noise Ratio (SINR) estimation of MU-MIMO users can be greatly reduced. This may enable a large number of user pairing alternatives to be evaluated in practical wireless systems to achieve improved MU-MIMO performance. This results in an increased spectrum usage and increased user throughput.

Some embodiments of the present disclosure may provide solutions to the aforementioned or other challenges. Some embodiments of the present disclosure propose a fast heuristic method to estimate SINR for MU-MIMO based on SINR for SU-MIMO and channel orthogonality.

Algorithms for both uplink MU-MIMO and downlink MU-MIMO are described. The proposed method can also be used in other MU-MIMO applications such as coordinated MU-MIMO and Coordinated Multi-Point (CoMP) and wherever user-pairing is needed, etc.

There are, proposed herein, various embodiments which address one or more of the issues disclosed herein. In some embodiments, a method performed by a radio access node for estimating signal quality for users in a MU-MIMO system includes obtaining a SU-MIMO signal quality measurement for at least a first user and an additional user and obtaining an indication of orthogonality between a channel of the first user and a channel of the additional user. The method also includes estimating a MU-MIMO signal quality measurement for the first user as if the first user and the additional user are paired with each other for a potential MU-MIMO transmission based on the SU-MIMO signal quality measurement for the first user and the additional user and the indication of orthogonality.

Certain embodiments may provide one or more of the following technical advantage(s). The computational complexity for the SINR estimation of MU-MIMO users is greatly reduced. A large number of user pairing alternatives can be evaluated in practical wireless systems to achieve improved MU-MIMO performance.

In some embodiments, the signal quality measurement is a SINR. In some embodiments, obtaining the indication of orthogonality between the channel of the first user and the channel of the additional user comprises calculating an orthogonality factor between the channel of the first user and the channel of the additional user based on a correlation coefficient between the channel of the first user and the channel of the additional user.

In some embodiments, the correlation coefficient between the channel of the first user and the channel of the additional user is:

$$\rho_{mn} = \frac{\langle h_m, h_n \rangle}{\|h_m\|\|h_n\|} \text{ where } \langle x, y \rangle = \sum_{i=0}^{N-1} x_i^* y_i \text{ and}$$

$$\|x\| = \sqrt{\sum_{i=0}^{N-1} |x|^2}$$

are an inner product and Frobenius norm operators, respectively, and $h_m$ and $h_n$ are channel vectors for the channel of the first user and the channel of the additional user, respectively. In some embodiments, the orthogonality factor between the channel of the first user and the channel of the additional user is: $\Theta_{mn} = |\rho_{mn}|^2$.

In some embodiments, estimating the MU-MIMO signal quality measurement for the first user comprises successively removing from the SU-MIMO signal quality measurement for the first user a SINR penalty of the additional user based on the indication of orthogonality between the channel of the first user and the channel of the additional user. In some embodiments, the first user is paired with one or more additional users and estimating the MU-MIMO signal quality measurement for the first user further comprises successively removing from the SU-MIMO signal quality measurement for the first user a SINR penalty of the one or more additional users based on the indication of orthogonality between the channel of the first user and the channel of the additional user.

In some embodiments, estimating the MU-MIMO signal quality measurement for the first user comprises calculating: $\gamma_m^{MU} = \gamma_m^{SU} \Pi_{n \neq m} f(\Theta_{mn}, \gamma_n^{SU})$. In some embodiments, estimating the MU-MIMO signal quality measurement for the first user comprises calculating: $\gamma_{m,i}^{MU} = \gamma_{m,i}^{SU} \Pi_{n \neq m} \Pi_{j=0}^{N_r-1} f(\Theta_{u_{m,i} u_{n,j}}, \gamma_{n,j}^{SU})$ where $\Theta_{u_{m,i} u_{n,j}}$ is the orthogonality factor between the antenna i of the first user and the antenna j of another user and $\gamma_{n,j}^{SU}$ is the SINR of transmit branch j of the other users.

In some embodiments, the MU-MIMO signal quality measurement for the first user is used for uplink MU-MIMO transmissions. In some embodiments, obtaining the SU-MIMO signal quality measurement for the first user comprises determining an average per receive branch signal quality measurement of the first user.

In some embodiments, estimating the MU-MIMO signal quality measurement for the first user comprises calculating: $\gamma_m^{MU} = \gamma_m^{SU} K_m \Pi_{n \neq m} f(\Theta_{mn}, \gamma_m^{SU})$ where $K_m$ represents a power sharing ratio. In some embodiments, estimating the MU-MIMO signal quality measurement for the first user comprises calculating: $\gamma_{m,i}^{MU} = \gamma_{m,i}^{SU} K_m \Pi_{n \neq m} \Pi_{j \in \{0, 1, \ldots, N_{r-1}\}} f(\Theta_{u_{m,i} u_{n,j}}, \gamma_m^{BRANCH})$ where $K_m$ represents a power sharing ratio.

In some embodiments, the MU-MIMO signal quality measurement for the first user is used for downlink MU-MIMO transmissions. In some embodiments, each user is a wireless device. In some embodiments, the radio access node is a New Radio Base Station (gNB).

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

Figure 1:
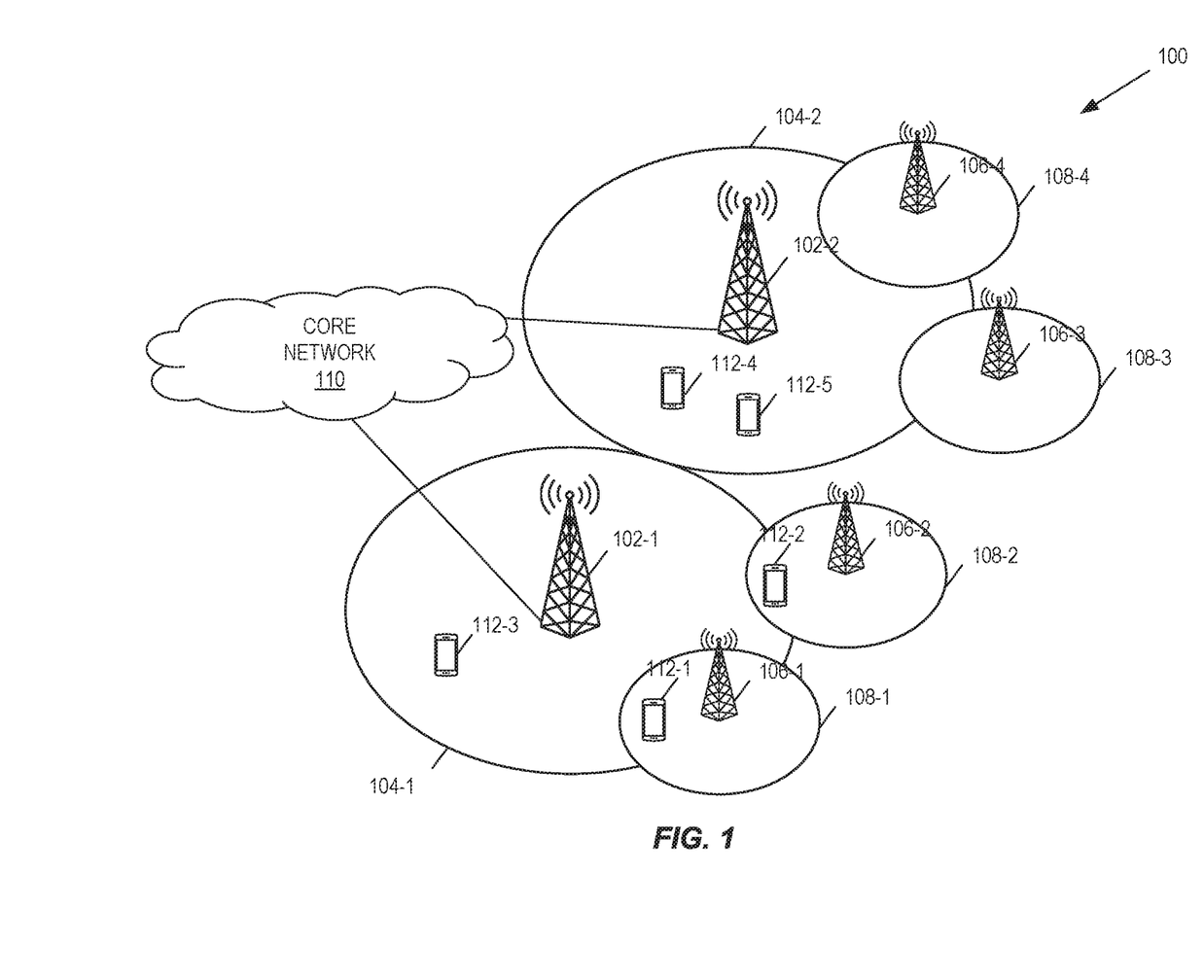
FIG. 1 illustrates one example of a cellular communications network according to some embodiments of the present disclosure.

FIG. 1 illustrates one example of a cellular communications network 100 according to some embodiments of the present disclosure. In the embodiments described herein, the cellular communications network 100 is a 5G New Radio (NR) network. In this example, the cellular communications network 100 includes base stations 102-1 and 102-2, which in LTE are referred to as eNBs and in 5G NR are referred to as gNBs, controlling corresponding macro cells 104-1 and 104-2. The base stations 102-1 and 102-2 are generally referred to herein collectively as base stations 102 and individually as base station 102. Likewise, the macro cells 104-1 and 104-2 are generally referred to herein collectively as macro cells 104 and individually as macro cell 104. The cellular communications network 100 also includes a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The base stations 102 (and optionally the low power nodes 106) are connected to a core network 110.

The base stations 102 and the low power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs.

Channel Orthogonality and SINR Penalty by an Interferer Layer

The performance of a Multi-User Multiple-Input and Multiple-Output, MU-MIMO, system is limited due to the presence of inter-layer or inter-user interference, which depends on the correlation of the channels between the paired users. The correlation coefficient $\rho_{mn}$ between any two channel vectors $h_m$ and $h_n$ can be defined as:

$$\rho_{mn} = \frac{\langle h_m, h_n \rangle}{\|h_m\| \|h_n\|}, \text{ where } \langle x, y \rangle = \sum_{i=0}^{N-1} x_i^* y_i \text{ and} \quad (1)$$

$$\|x\| = \sqrt{\sum_{i=0}^{N-1} |x|^2}$$

are the inner product and Frobenius norm operators, respectively. Based on $\rho_{mn}$, the Orthogonality Factor (OF) between two channels is defined as:

$$\Theta_{mn} = |\rho_{mn}|^2 \quad (2)$$

Figure 2:
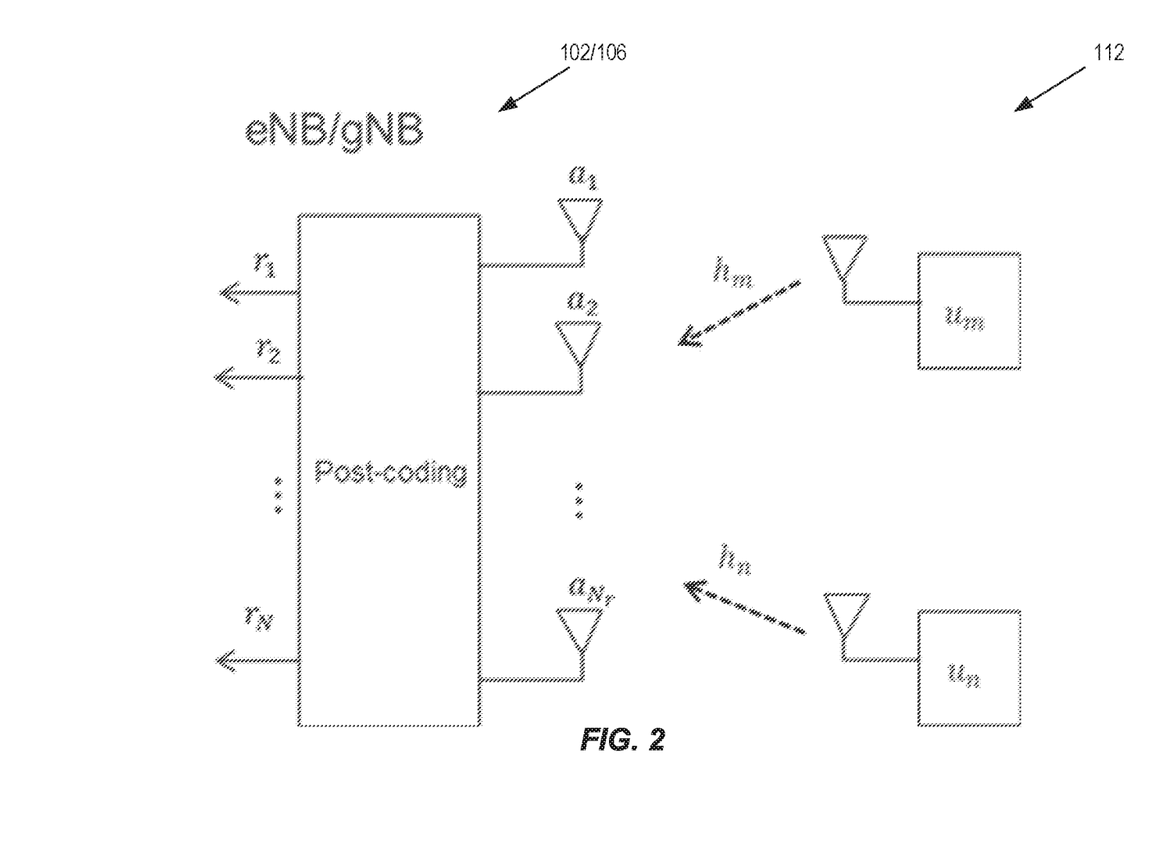
FIG. 2 illustrates a wireless uplink system with two users $u_m$ and $u_n$, where each user is equipped with one transmit antenna and a base station is equipped with multiple receive antennas according to some embodiments of the present disclosure.

Consider a wireless uplink system with two users $u_m$ and $u_n$, where each user is equipped with one transmit antenna and base station 102 is equipped with multiple receive antennas as depicted in FIG. 2. Here, the eNB/gNB could possibly be any of the base stations 102 or low power nodes 106, and the users could be any of the wireless devices 112, described above in relation to FIG. 1. For convenience, this will be referred to herein as base station 102. Let $\gamma_m^{SU}$ be the Single Input Multiple Output (SIMO) Signal-to-Interference-and-Noise Ratio (SINR) measured on base station 102 when only user $u_m$ transmits signals without pairing. If another user $u_n$ transmits simultaneously on the same time frequency resource, i.e., two users are paired, an interference to the reception of signal of $u_m$ will be introduced due to the correlation of the channels $h_m$ (the channels between eNB/gNB and $u_m$) and $h_n$ (the channels between eNB/gNB and $u_n$). The strength of interference can be modeled by the SINR of the interferer. Therefore, the MU-MIMO SINR $\gamma_m^{MU}$ and Single-User Multiple-Input and Multiple-Output, SU-MIMO $\gamma_m^{SU}$ can be related by taking into account the channel orthogonality and interferer's SINR and expressed as:

$$\gamma_m^{MU} = f(\Theta_{mn}, \gamma_n^{SU}) \gamma_m^{SU} \quad (3)$$

where $0 < f(\Theta_{mn}, \gamma_n^{SU}) \le 1$ is a function representing the SINR penalty to $u_m$ due to user-pairing.

Figure 3:
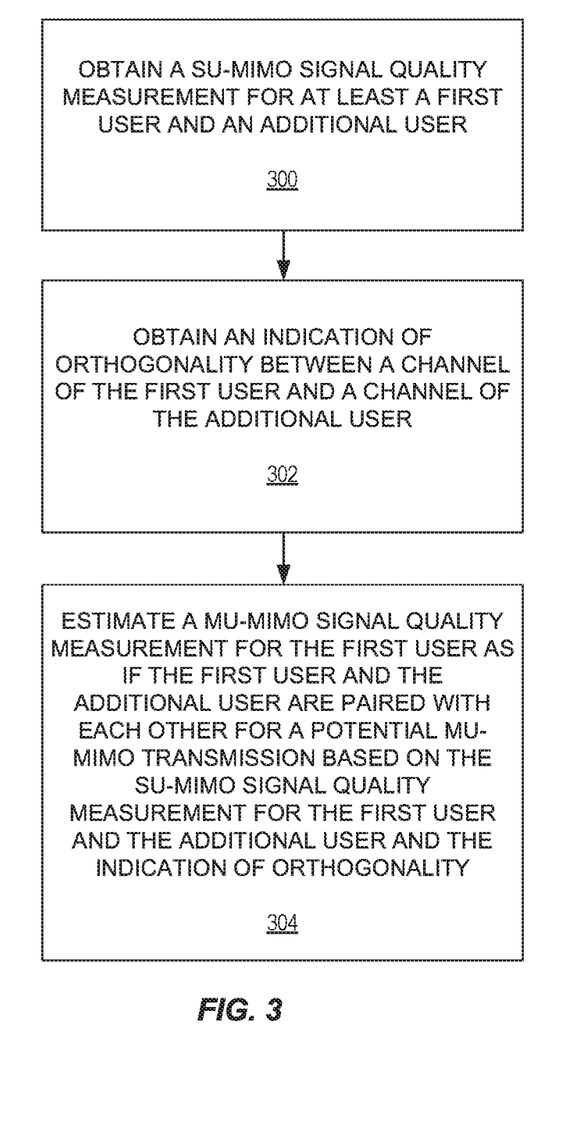
FIG. 3 illustrates a method implemented in a communication system according to some embodiments of the present disclosure.

FIG. 3 illustrates a method performed by a base station 102 for estimating signal quality for users in a MU-MIMO system. The base station 102 obtains a SU-MIMO signal quality measurement for at least a first user and an additional user (step 300). These could be obtained by receiving the values from the first user and the additional user or these values could be calculated based on other values. The base station 102 obtains an indication of orthogonality between a channel of the first user and a channel of the additional user (step 302). In some embodiments, this is the OF discussed above. Next, the base station 102 estimates a MU-MIMO signal quality measurement for the first user as if the first user and the additional user are paired with each other for a potential MU-MIMO transmission based on the SU-MIMO signal quality measurement for the first user and the additional user and the indication of orthogonality (step 304). These estimated MU-MIMO signal quality measurements may be used to determine a preferred pairing of users for a MU-MIMO transmission. This may provide a greatly reduced computational complexity for the SINR estimation of MU-MIMO users. This in turn may allow a larger number of user pairing alternatives to be evaluated to achieve improved MU-MIMO performance.

In case the Maximal-Ratio Combining (MRC) receiver is used for SIMO reception and the Minimum Mean Square Error (MMSE) receiver is used for MIMO reception, the SINR penalty can be calculated by (for more information, see: S. Dhaka) and J. Kim, "Statistical analysis of user-pairing algorithms in virtual MIMO systems," Wireless Telecommunications Symposium (WTS), 21-23 Apr. 2010):

$$f(\Theta_{mn}, \gamma_n^{SU})\gamma_m^{SU} = \left(\frac{1 + (1 - \Theta_{mn})\gamma_n^{SU}}{1 + \gamma_n^{SU}}\right)\gamma_m^{SU}, \quad (4)$$

SINR Estimation for Uplink MU-MIMO

Figure 4:
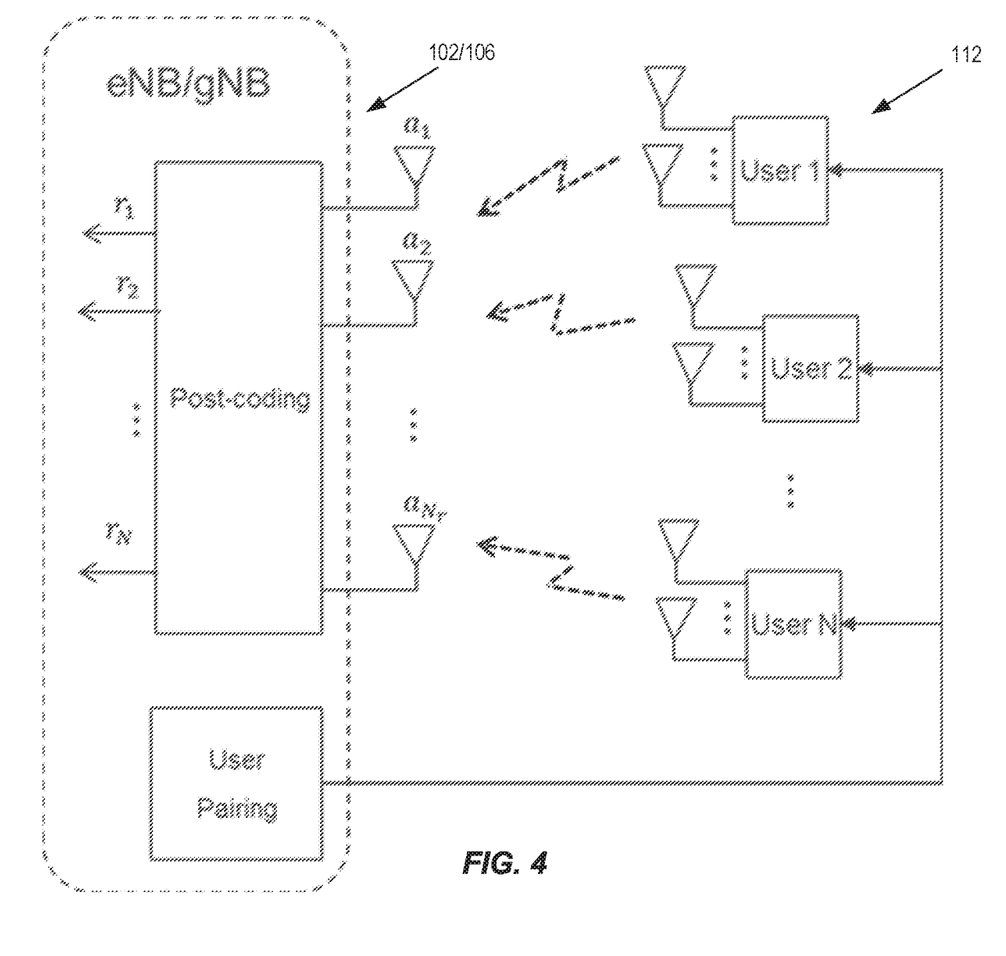
FIG. 4 illustrates a general uplink Multiple Input Multiple Output (MIMO) system where N users $u_n$, n=0, 1, ..., N−1, are transmitting to the same enhanced or evolved nodeB (eNB) or New Radio nodeB (gNB) according to some embodiments of the present disclosure.

Consider a more general uplink MIMO system where N users $u_n$, $n=0, 1, \ldots, N-1$, are transmitting to the same eNB/gNB as illustrated by FIG. 4. The eNB/gNB has $N_r$ receive antennas and each user is equipped with $N_t$ antennas. Each user $u_n$ transmits $N_t$ independent data streams and each data stream is transmitted over one antenna with power $q_n$. Let $N_t \times 1$ complex vector $x_n$ be the data signal transmitted by $u_n$, the data signal by all users can be modeled as $x=[x_0^T, x_1^T, \ldots, x_{N-1}^T]^T$. Denote $h_n$ as the $N_r \times N_t$ channel matrix for user $u_n$. The channel experience by all users H can be modeled as a matrix of dimension $N_r \times (NN_t)$:

$$H=[\sqrt{q_0}h_0, \sqrt{q_1}h_1, \ldots, \sqrt{q_{N-1}}h_{N-1}] \quad (5)$$

The $N_r \times 1$ received signal y at the eNB/gNB can be expressed as:

$$y=Hx+n, \quad (6)$$

where the n is a $N_r \times 1$ noise vector whose elements are independent and identically distributed Gaussian with zero mean and variance matrix $\sigma^2$.

To separate the data streams sent by different users, a MU-MIMO detection technique must be used. The optimum detector is a Maximum Likelihood (ML) detector. However, as its complexity cost grows exponentially with the number of transmit antennas and modulation order used, implementation in systems with hundreds of antennas such as massive MIMO systems is impractical. In practical systems, the most widely used MU-MIMO detector is an MMSE detector. The receive beamforming weights by MMSE detector can be given by (for more information, see: E. Björnson, M. Bengtsson, and B. Ottersten, "Optimal Multiuser Transmit Beamforming: A Difficult Problem with a Simple Solution Structure," IEEE Signal Processing Magazine (Volume: 31, Issue: 4, Jul. 2014):

$$W=[H^H H+\sigma^2 I]^{-1} H^H \quad (7)$$

and the uplink SINR for the l-th layer, $l=0, 1, \ldots, N_t-1$, of user $u_n$ can be approximated as:

$$\gamma_{u_{n,l}}^{MU} = \frac{\frac{q_m}{\sigma^2}|(WH)_{j,j}|^2}{\sum_{i \neq j} \frac{q_n}{\sigma^2}|(WH)_{j,i}|^2 + (WW^H)_{j,j}} \quad (8)$$

where $j=nN_t+l$ is the index of diagonal element in WH and $WW^H$ corresponding to the l-th layer of user $u_n$.

The estimation of $\gamma_{u_{mn}}^{MU}$ according to Equation (8) needs the MU-MIMO MMSE weights W for all combinations of users. Even though the Equation (7) has lower complexity than Maximum-Likelihood (ML) detector, it needs the inversion of a matrix with dimension $NN_t \times NN_t$ for each possible user combination. This is still expensive in practical system implementation, in particular, when fixed-point Digital Signal Processor (DSP) programming is used.

To further reduce the computational complexity to estimate SINR for MU-MIMO users, some embodiments of the current disclosure propose a fast heuristic method by first extending Equation (3) to the general uplink MIMO system described by Equation (6). Then in the next section, some embodiments related to downlink MIMO systems are discussed.

Consider the case in which each user is equipped with one transmit antenna. Since an MMSE receive beamformer tends to spatially decouple users by null forming, the interference from other layers or users can be considered independently. Therefore, when more than two one-transmit-antenna users are paired together, the MU-MIMO SINR of $u_m$ can be estimated by:

$$\gamma_m^{MU}=\gamma_m^{SU}\Pi_{n \neq m} f(\Theta_{mn}, \gamma_n^{SU}), \quad (9)$$

When converting the Equation (9) into dB domain, the MU-MIMO SINR of $u_m$ can be expressed as:

$$\gamma\_dB_m^{MU}=\gamma\_dB_m^{SU}+\Sigma_{n \neq m} f\_dB(\Theta_{mn}, \gamma_n^{SU}), \quad (10)$$

where $\gamma\_dB_m^{MU}$, $\gamma\_dB_m^{SU}$ and f_dB are the representations of $\gamma_m^{MU}$, $\gamma_m^{SU}$ and f in dB, respectively. From Equation (10), it can be seen that the MU-MIMO SINR of interfered user $u_m$ can be obtained by successively removing from its SU-MIMO SINR the SINR penalties of all paired users based on the channel orthogonality.

Furthermore, for more general cases in which each user is equipped with $N_t$ transmit antennas, $N_t \geq 1$, the SINR of transmit branch i of $u_m$ can be estimated with:

$$\gamma_{m,i}^{MU}=\gamma_{m,i}^{SU}\Pi_{n \neq m}\Pi_{j=0}^{N_t-1} f(\Theta_{u_m,i u_n,j}, \gamma_{n,j}^{SU}), \quad (11)$$

where $\Theta_{u_m,i u_n,j}$ is the OF between the antenna i of user $u_m$ and the antenna j of user $u_n$.

$\gamma_{n,j}^{SU}$ is the SINR of transmit branch j of $u_n$.

Equation (11) can also be described in dB domain:

$$\gamma\_dB_{m,i}^{MU}=\gamma\_dB_{m,i}^{SU}+\Sigma_{n \neq m}\Sigma_{j=0}^{N_t-1} f\_dB(\Theta_{u_m,i u_n,j}, \gamma_{n,j}^{SU}), \quad (12)$$

Note that the transmit branch of a user is usually identified by the pilot signal associated with it. In a more general case, a data stream or layer can be mapped to one or more transmit branches, and one or more data streams can be sent over the same transmit branch. The mapping from per transmit branch SINR to per transmit layer SINR or per codeword SINR depends on MIMO scheme used and can usually be achieved with a classical Maximum Ratio Combining (MRC) or Interference Rejection Combining (IRC) receiver SINR combining algorithms. Hence the proposed method can be applied to those cases as well.

SINR Estimation for Downlink MU-MIMO

Figure 5:
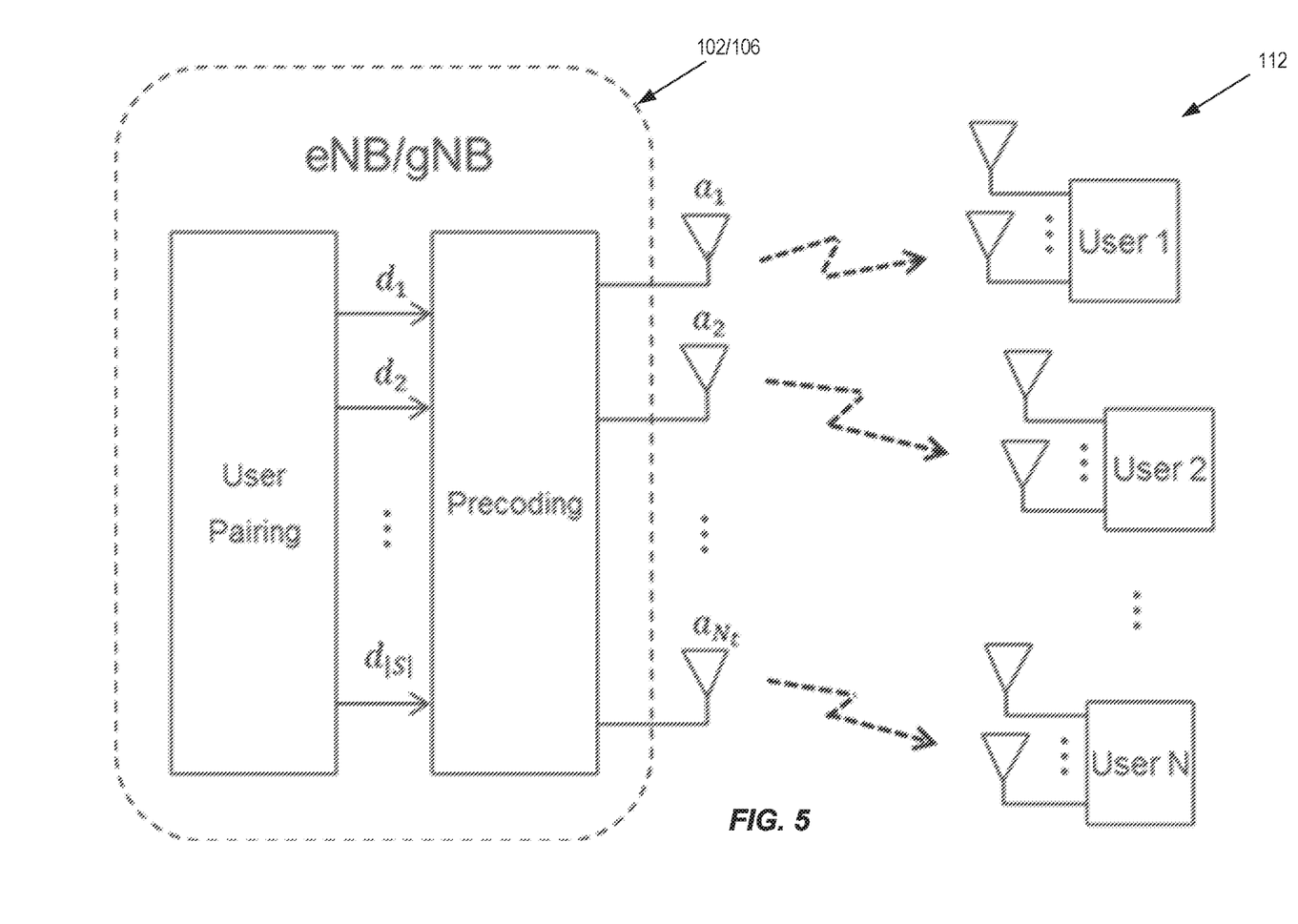
FIG. 5 illustrates a base station equipped with $N_t$ antennas communicating with N users according to some embodiments of the present disclosure.

Consider now a downlink MIMO system as shown in FIG. 5, where a base station 102 equipped with $N_t$ antennas communicates with N users $u_n$, n=0, 1, . . . , N−1, using MMSE transmit beamforming or SDMA. Each user is equipped with $N_r$ receive antennas. Again, for the sake of simplicity, it is assumed that one independent data stream is transmitted by the base station 102 to the receiver antenna of each user. Let $N_r \times 1$ complex vector $x_n$ be the data signal transmitted to $u_n$, the data signal to all users is denoted as $x=[x_0^T, x_1^T, \ldots, x_{N-1}^T]^T$ with $E\{xx^H\}=I$. Denote $h_n$ as the $N_r \times N_t$ channel matrix for user $u_n$. The channel experience by all users H can be modeled as a matrix of dimension $NN_r \times N_t$ $$H=[h_0^T, h_1^T, \ldots, h_{N-1}^T]^T \quad (13)$$

The $l=NN_r$ different data signal layers are separated spatially by using appropriate beamforming or SDM $N_t \times NN_r$ precoding weights $W=[w_0, w_1, \ldots, w_{N-1}]$, where $N_t \times N_r$ weights $w_n$ are the weights for $u_n$, n=0, 1, . . . , N−1. The weights W can be approximated by:

$$W=[H^H H+\Gamma]^{-1} H^H \quad (14)$$

where $\Gamma$ is the estimated interference covariance matrix of dimension $NN_r \times NN_r$. Unlike $\sigma^2 I$ in Equation (7), $\Gamma$ is not necessarily a diagonal matrix and its diagonal elements are not necessary identical. The total power of all beamforming weights is normalized to unity, i.e., $\Sigma_{n=0}^{N-1} \|w_n\|^2 = 1$. Also the transmit power of base station 102 is shared equally by all transmitted layers, and the weights $w_n$, n=0, 1, . . . , N−1, are scaled proportionally. Let $l=NN_r$ be the total number of layers to transmit. The percentage of power allocated to $u_n$ is:

$$K_n = \frac{1}{N} = \frac{\|w_n\|^2}{\sum_{n=0}^{N-1} \|w_n\|^2} \text{ for } n = 0, 1, \ldots, N-1. \quad (15)$$

The received signal $r_n$ at user $u_n$ can then be modeled as $$r_n = h_n w_n x_n + \Sigma_{m \neq n} h_n w_m x_m + n_n, \quad (16)$$

where $n_m$ is additive receiver noise with zero mean and variance $\sigma^2$ perceived at $u_m$.

The estimation of SINR at a UE $u_n$ can be done using a conventional MIMO detector such as an MRC, IRC or MMSE and then sent back to base station 102. The SINR of i-th layer of $u_n$ can be approximated by:

$$\gamma_{u_{n,i}}^{SU} = \frac{\|(v_n h_n w_n)_{i,i}\|^2}{\Sigma_{j \neq i} \|(v_n h_n w_n)_{i,j}\|^2 + \sigma^2}, \quad (17)$$

where $N_r \times N_r$ matrix $v_n$ is the receiver weights and can be calculated with Equation (7).

The user pairing, and consequently SINR estimation, for downlink MU-MIMO needs to be determined in the base station 102. As $\Gamma$ is not necessarily a diagonal matrix and its diagonal elements are not necessary identical, the Equation (8) cannot be used to calculate SINR anymore. The raw received signal power and received total power for users should be calculated to estimate SINR. To simplify the problem to get an explicit solution, assume that the base station 102 uses the same receiver weights users use. The received combined signal at the user $u_n$ can be expressed as:

$$y_n = v_n h_n w_n x_n + \Sigma_{m \neq n} v_n h_n w_m x_m + v_n n_n \quad (18)$$

The total received power of i-th layer of $u_n$ can be calculated by $$P_{u_{n,i}}^{tot} = E\{|y_n(i)|^2\} = E\{v_n(i,:) h_n w_n x_n x_n^H w_n^H h_n^H v_n(i,:)^H\} + v_n(i,:) \sigma\sigma^H v_n(i,:)^H \quad (19)$$

The amount of useful signal power is $$P_i^{sig} = E\{|v_n(i,:) h_n w_n(:,i)|^2\} \quad (20)$$

The estimated SINR for i-th layer of $u_n$ can be calculated from the "signal-to-noise-plus-signal ratio"

$$P_i^{sig} / P_{u_{n,i}}^{tot}: \quad (21)$$

$$\gamma_{u_{n,i}}^{MU} = \frac{1}{\frac{1}{P_i^{sig}/P_{u_{n,i}}^{tot}} - 1} \text{ for all } n, i$$

From the description above, one can see that the estimation of SINR for downlink MU-MIMO is even more complex than that for uplink MU-MIMO.

Consider now extension of the fast algorithm described above to downlink MU MIMO. There are two fundamental differences between downlink MU-MIMO and uplink MU-MIMO. First, for uplink MU-MIMO, interference arrives through the channels from other users, while in downlink MU-MIMO, the interference originates from the beamforming vectors of other users. As the users are geometrically distributed, $\gamma_n^{SU}$ in Equations (1) and (2), which is perceived by other user receivers geometrically distributed, does not reflect the interference from other users anymore. The accurate estimation of interference component in Equation (17) ($\Sigma_{n \neq m} \|h_m w_n\|^2$) needs MU-MIMO beamforming weights $w_n$, n≠m, which some embodiments seek to avoid. One way to overcome this problem is to use average per receive branch SINR of user $u_m$ to approximate $\gamma_n^{SU}$. Let $\gamma_m^{SU}$ be the combined SINR estimated for $u_m$. The receive branch SINR of user $u_m$ can be approximated by $\gamma_m^{BRANCH} = \gamma_m^{SU}/N_r$.

Another difference is, as mentioned above, in downlink MU-MIMO, the eNB/gNB transmit power is shared by all data signal layers. The power sharing ratio $K_m$ represents the SINR loss of $u_m$ caused by power sharing.

With these two differences in mind, for the case in which each user is equipped with one receive antenna, the Equation (9) proposed for uplink can be adapted to downlink MU-MIMO as:

$$\gamma_m^{MU} = \gamma_m^{SU} K_m \Pi_{n \neq m} f(\Theta_{mn}, \gamma_m^{SU}) \quad (22)$$

Or equivalently in dB domain:

$$\gamma\_dB_m^{MU} = \gamma\_dB_m^{SU} + 10 \log_{10}(K_m) + \Sigma_{n \neq m} f\_dB(\Theta_{mn}, \gamma_m^{SU}) \quad (23)$$

Furthermore, in case each user is equipped with $N_r$ receive antennas, the SINR of receive branch i of user $u_m$ can be estimated by $$\gamma_{m,i}^{MU} = \gamma_{m,i}^{SU} K_m \Pi_{n \neq m} \Pi_{j \in \{0,1,\ldots,N_r-1\}} f(\Theta_{u_{m,i} u_{n,j}}, \gamma_m^{BRANCH}) \quad (24)$$

or $$\gamma\_dB_{m,i}^{MU} = \gamma\_dB_{m,i}^{SU} + 10 \log_{10}(K_m) + \Sigma_{n \neq m} \Sigma_{j=0}^{N_r-1} f\_dB(\Theta_{u_{m,i} u_{n,j}}, \gamma_m^{BRANCH}) \quad (25)$$

Again, the mapping from per receive branch SINR to per layer SINR or per codeword SINR depends on MIMO transmission scheme and can usually be achieved with classical MRC or IRC receiver SINR combining algorithms.

Figure 6:
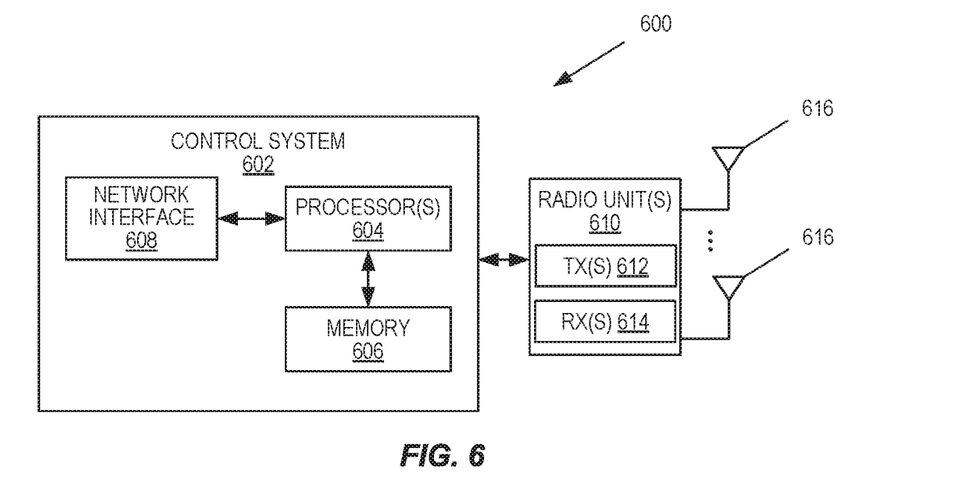
FIG. 6 is a schematic block diagram of a radio access node according to some embodiments of the present disclosure.

FIG. 6 is a schematic block diagram of a radio access node 600 according to some embodiments of the present disclosure. The radio access node 600 may be, for example, a base station 102 or 106. As illustrated, the radio access node 600 includes a control system 602 that includes one or more processors 604 (e.g., Central Processing Units (CPUs), Application Specific Integrated Circuits (ASICs), Field Programmable Gate Arrays (FPGAs), and/or the like), memory 606, and a network interface 608. In addition, the radio access node 600 includes one or more radio units 610 that each includes one or more transmitters 612 and one or more receivers 614 coupled to one or more antennas 616. In some embodiments, the radio unit(s) 610 is external to the control system 602 and connected to the control system 602 via, e.g., a wired connection (e.g., an optical cable). However, in some other embodiments, the radio unit(s) 610 and potentially the antenna(s) 616 are integrated together with the control system 602. The one or more processors 604 operate to provide one or more functions of a radio access node 600 as described herein. In some embodiments, the function(s) are implemented in software that is stored, e.g., in the memory 606 and executed by the one or more processors 604.

Figure 7:
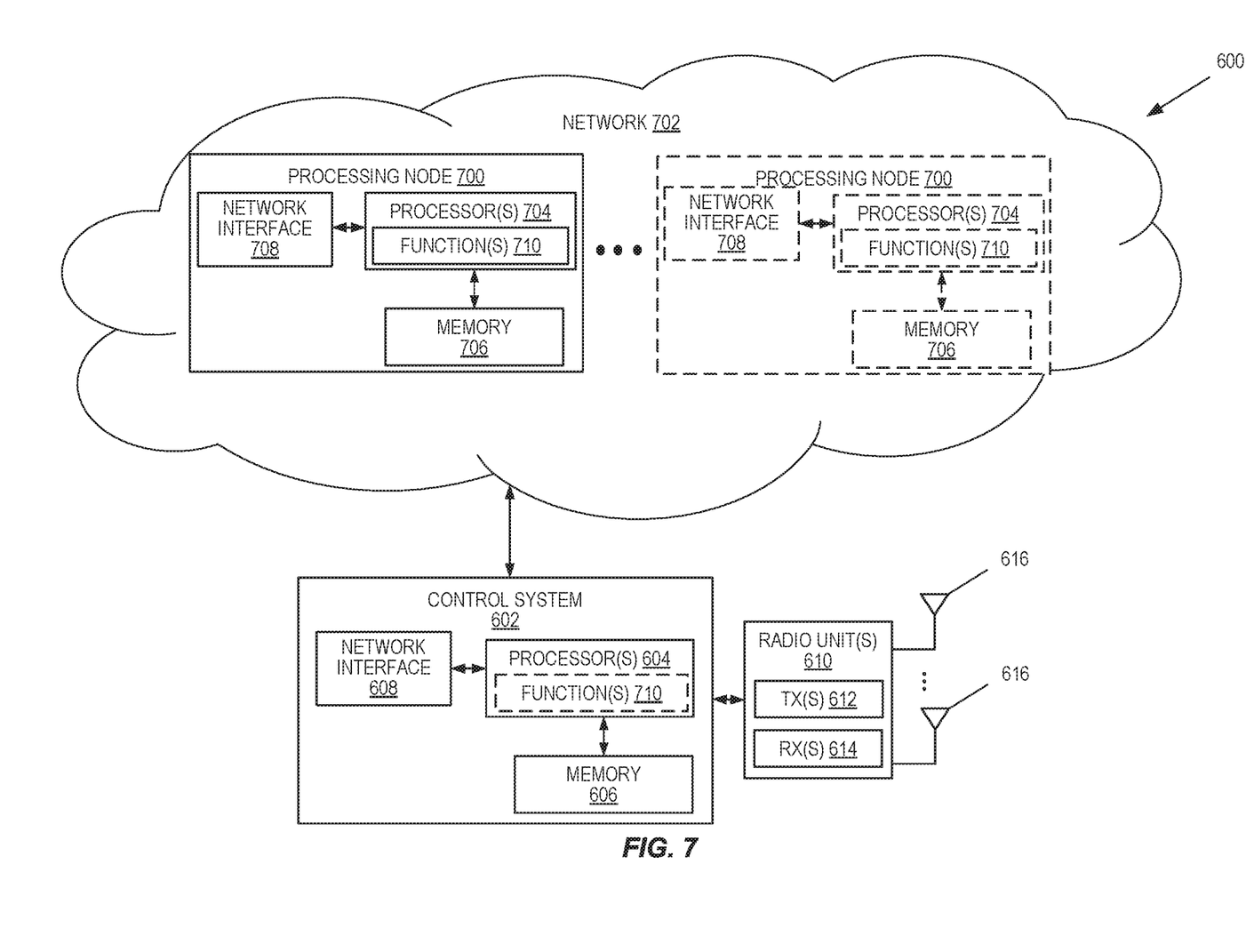
FIG. 7 is a schematic block diagram that illustrates a virtualized embodiment of the radio access node according to some embodiments of the present disclosure.

FIG. 7 is a schematic block diagram that illustrates a virtualized embodiment of the radio access node 600 according to some embodiments of the present disclosure. This discussion is equally applicable to other types of network nodes. Further, other types of network nodes may have similar virtualized architectures.

As used herein, a "virtualized" radio access node is an implementation of the radio access node 600 in which at least a portion of the functionality of the radio access node 600 is implemented as a virtual component(s) (e.g., via a virtual machine(s) executing on a physical processing node(s) in a network(s)). As illustrated, in this example, the radio access node 600 includes the control system 602 that includes the one or more processors 604 (e.g., CPUs, ASICs, FPGAs, and/or the like), the memory 606, and the network interface 608 and the one or more radio units 610 that each includes the one or more transmitters 612 and the one or more receivers 614 coupled to the one or more antennas 616, as described above. The control system 602 is connected to the radio unit(s) 610 via, for example, an optical cable or the like. The control system 602 is connected to one or more processing nodes 700 coupled to or included as part of a network(s) 702 via the network interface 608. Each processing node 700 includes one or more processors 704 (e.g., CPUs, ASICs, FPGAs, and/or the like), memory 706, and a network interface 708.

In this example, functions 710 of the radio access node 600 described herein are implemented at the one or more processing nodes 700 or distributed across the control system 602 and the one or more processing nodes 700 in any desired manner. In some particular embodiments, some or all of the functions 710 of the radio access node 600 described herein are implemented as virtual components executed by one or more virtual machines implemented in a virtual environment(s) hosted by the processing node(s) 700. As will be appreciated by one of ordinary skill in the art, additional signaling or communication between the processing node(s) 700 and the control system 602 is used in order to carry out at least some of the desired functions 710. Notably, in some embodiments, the control system 602 may not be included, in which case the radio unit(s) 610 communicates directly with the processing node(s) 700 via an appropriate network interface(s).

In some embodiments, a computer program including instructions which, when executed by at least one processor, causes the at least one processor to carry out the functionality of radio access node 600 or a node (e.g., a processing node 700) implementing one or more of the functions 710 of the radio access node 600 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
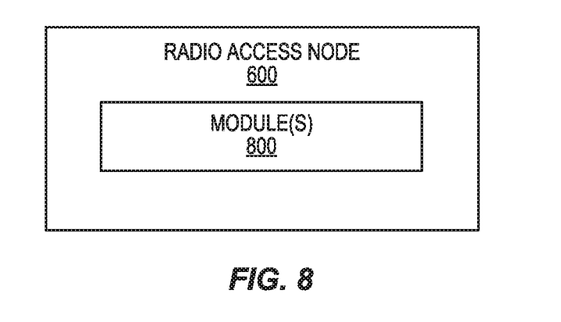
FIG. 8 is a schematic block diagram of the radio access node according to some other embodiments of the present disclosure.

FIG. 8 is a schematic block diagram of the radio access node 600 according to some other embodiments of the present disclosure. The radio access node 600 includes one or more modules 800, each of which is implemented in software. The module(s) 800 provide the functionality of the radio access node 600 described herein. This discussion is equally applicable to the processing node 700 of FIG. 7 where the modules 800 may be implemented at one of the processing nodes 700 or distributed across multiple processing nodes 700 and/or distributed across the processing node(s) 700 and the control system 602.

Figure 9:
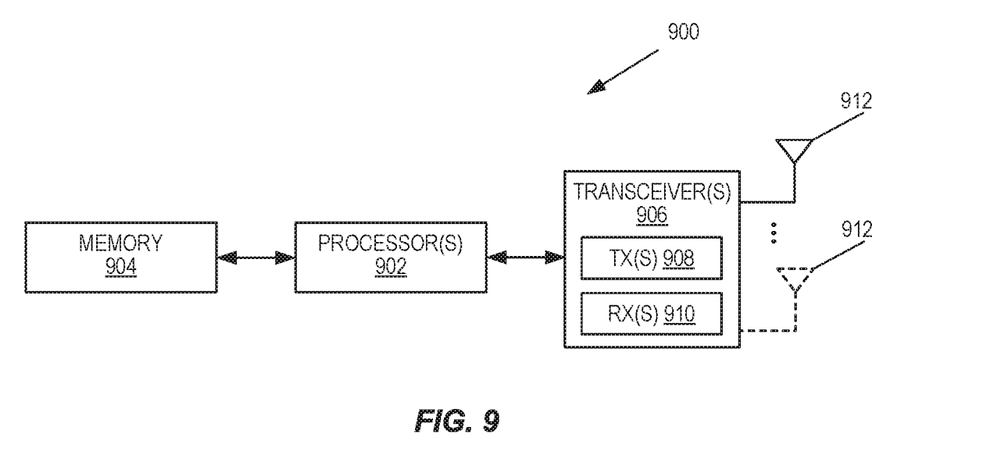
FIG. 9 is a schematic block diagram of a User Equipment (UE) according to some embodiments of the present disclosure.

FIG. 9 is a schematic block diagram of a UE 900 according to some embodiments of the present disclosure. The UE 900 may be, for example, a wireless device 112. As illustrated, the UE 900 includes one or more processors 902 (e.g., CPUs, ASICs, FPGAs, and/or the like), memory 904, and one or more transceivers 906 each including one or more transmitters 908 and one or more receivers 910 coupled to one or more antennas 912. In some embodiments, the functionality of the UE 900 described above may be fully or partially implemented in software that is, e.g., stored in the memory 904 and executed by the processor(s) 902.

In some embodiments, a computer program including instructions which, when executed by at least one processor, causes the at least one processor to carry out the functionality of the UE 900 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
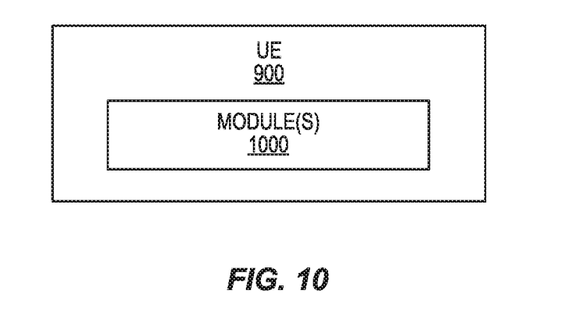
FIG. 10 is a schematic block diagram of the UE according to some other embodiments of the present disclosure.

FIG. 10 is a schematic block diagram of the UE 900 according to some other embodiments of the present disclosure. The UE 900 includes one or more modules 1000, each of which is implemented in software. The module(s) 1000 provide the functionality of the UE 900 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).
  3GPP Third Generation Partnership Project
  4G Fourth Generation
  5G Fifth Generation
  ASIC Application Specific Integrated Circuit
  CoMP Coordinated Multi-Point
  CPU Central Processing Unit
  DSP Digital Signal Processor
  eNB E-UTRAN Node B, also known as Evolved Node B
  ePDCCH Enhanced Physical Downlink Control Channel
  FPGA Field Programmable Gate Array
  GHz Gigahertz
  gNB New Radio Base Station
  IRC Interference Rejection Combining
  LTE Long Term Evolution
  MIMO Multiple Input Multiple Output
  ML Maximum-Likelihood
  MME Mobility Management Entity
  MMSE Minimum Mean Square Error
  MRC Maximum Ratio Combining
  MTC Machine Type Communication
  MU-MIMO Multi-User MIMO
  OF Orthogonality Factor
  P-GW Packet Data Network Gateway
  RAM Random Access Memory
  ROM Read Only Memory
  RRH Remote Radio Head
  SCEF Service Capability Exposure Function
  SIMO Single Input Multiple Output
  SINR Signal to Interference and Noise Ratio
  SNR Signal to Noise Ratio
  SU-MIMO Single-User MIMO
  UE User Equipment Those skilled in the art will recognize improvements and modifications to the embodiments of the present disclosure. All such improvements and modifications are considered within the scope of the concepts disclosed herein.

What is claimed is:

1. A method performed by a radio access node for estimating signal quality for users in a Multi-User Multiple Input Multiple Output, MU-MIMO, system, the method comprising:
   obtaining a Single-User MIMO, SU-MIMO, signal quality measurement for at least a first user and an additional user;
   obtaining an indication of orthogonality between a channel of the first user and a channel of the additional user; and
   estimating a MU-MIMO signal quality measurement for the first user as if the first user and the additional user are paired with each other for a potential MU-MIMO transmission based on the SU-MIMO signal quality measurement for the first user and the additional user and the indication of orthogonality, wherein estimating the MU-MIMO signal quality measurement for the first user comprises successively removing from the SU-MIMO signal quality measurement for the first user a SINR penalty of the additional user based on the indication of orthogonality between the channel of the first user and the channel of the additional user.

2. The method of claim 1, wherein the signal quality measurement is a Signal to Interference and Noise Ratio, SINR.

3. The method of claim 1, wherein obtaining the indication of orthogonality between the channel of the first user and the channel of the additional user comprises calculating an orthogonality factor between the channel of the first user and the channel of the additional user based on a correlation coefficient between the channel of the first user and the channel of the additional user.

4. The method of claim 3, wherein the correlation coefficient between the channel of the first user and the channel of the additional user is:

$$\rho_{mn} = \frac{\langle h_m, h_n \rangle}{\|h_m\| \|h_n\|} \text{ where } \langle x, y \rangle = \sum_{i=0}^{N-1} x_i^* y_i \text{ and}$$

$$\|x\| = \sqrt{\sum_{i=0}^{N-1} |x|^2}$$

are an inner product and Frobenius norm operators, respectively, and $h_m$ and $h_n$ are channel vectors for the channel of the first user and the channel of the additional user, respectively.

5. The method of claim 4, wherein the orthogonality factor between the channel of the first user and the channel of the additional user is:

$$\Theta_{mn} = |\rho_{mn}|^2.$$

6. The method of claim 1, wherein the first user is paired with one or more additional users and estimating the MU-MIMO signal quality measurement for the first user further comprises successively removing from the SU-MIMO signal quality measurement for the first user a SINR penalty of the one or more additional users based on the indication of orthogonality between the channel of the first user and the channel of the additional user.

7. The method of claim 1, wherein estimating the MU-MIMO signal quality measurement for the first user comprises calculating:

$$\gamma_m^{MU} = \gamma_m^{SU} \Pi_{n \neq m} f(\Theta_{mn}, \gamma_n^{SU}).$$

8. The method of claim 1, wherein estimating the MU-MIMO signal quality measurement for the first user comprises calculating:

$$\gamma_{m,i}^{MU} = \gamma_{m,i}^{SU} \Pi_{n \neq m} \Pi_{j=0}^{N_r-1} f(\Theta_{u_{m,i} u_{n,j}}, \gamma_{n,j}^{SU})$$

where $\Theta_{u_{m,i} u_{n,j}}$ is the orthogonality factor between the antenna i of the first user and the antenna j of another user and $\gamma_{n,j}^{SU}$ is the SINR of transmit branch j of the other users.

9. The method of claim 1, wherein the MU-MIMO signal quality measurement for the first user is used for uplink MU-MIMO transmissions.

10. The method of claim 1, wherein obtaining the SU-MIMO signal quality measurement for the first user comprises determining an average per receive branch signal quality measurement of the first user.

11. The method of claim 1, wherein estimating the MU-MIMO signal quality measurement for the first user comprises calculating:

$$\gamma_m^{MU} = \gamma_m^{SU} K_m \Pi_{n \neq m} f(\Theta_{mn}, \gamma_m^{SU})$$

where $K_m$ represents a power sharing ratio.

12. The method of claim 1, wherein estimating the MU-MIMO signal quality measurement for the first user comprises calculating:

$$\gamma_{m,i}^{MU} = \gamma_{m,i}^{SU} K_m \Pi_{n \neq m} \Pi_{j \in \{0,1,\ldots,N_{r-1}\}} f(\Theta_{u_{m,i} u_{n,j}}, \gamma_m^{BRANCH})$$

where $K_m$ represents a power sharing ratio.

13. The method of claim 1, wherein the MU-MIMO signal quality measurement for the first user is used for downlink MU-MIMO transmissions.

14. The method of claim 1, wherein each user is a wireless device.

15. The method of claim 1, wherein the radio access node is a New Radio Base Station, gNB.

16. A radio access node comprising:
  one or more network interfaces;
  one or more processors; and
  memory comprising instructions executable by the one or more processors whereby the radio access node is operable to:
    obtain a Single-User Multiple Input Multiple Output, SU-MIMO, signal quality measurement for at least a first user and an additional user;
    obtain an indication of orthogonality between a channel of the first user and a channel of the additional user; and
    estimate a Multi-User MIMO, MU-MIMO, signal quality measurement for the first user as if the first user and the additional user are paired with each other for a potential MU-MIMO transmission based on the SU-MIMO signal quality measurement for the first user and the additional user and the indication of orthogonality, wherein estimating the MU-MIMO signal quality measurement for the first user comprises successively removing from the SU-MIMO signal quality measurement for the first user a SINR penalty of the additional user based on the indication of orthogonality between the channel of the first user and the channel of the additional user.

17. The radio access node of claim 16, wherein the signal quality measurement is a Signal to Interference and Noise Ratio, SINR.

18. The radio access node of claim 16, wherein obtaining the indication of orthogonality between the channel of the first user and the channel of the additional user comprises being operable to calculate an orthogonality factor between the channel of the first user and the channel of the additional user based on a correlation coefficient between the channel of the first user and the channel of the additional user.

19. The radio access node of claim 18, wherein the correlation coefficient between the channel of the first user and the channel of the additional user is:

$$\rho_{mn} = \frac{\langle h_m, h_n \rangle}{\|h_m\|\|h_n\|} \text{ where } \langle x, y \rangle = \sum_{i=0}^{N-1} x_i^* y_i \text{ and}$$

$$\|x\| = \sqrt{\sum_{i=0}^{N-1} |x|^2}$$

are an inner product and Frobenius norm operators, respectively, and $h_m$ and $h_n$, are channel vectors for the channel of the first user and the channel of the additional user, respectively.

20. The radio access node of claim 19, wherein the orthogonality factor between the channel of the first user and the channel of the additional user is:

$$\Theta_{mn} = |\rho_{mn}|^2.$$

21. The radio access node of claim 16, wherein the first user is paired with one or more additional users and estimating the MU-MIMO signal quality measurement for the first user further comprises being operative to successively remove from the SU-MIMO signal quality measurement for the first user a SINR penalty of the one or more additional users based on the indication of orthogonality between the channel of the first user and the channel of the additional user.

22. The radio access node of claim 16, wherein estimating the MU-MIMO signal quality measurement for the first user comprises being operable to calculate:

$$\gamma_m^{MU} = \gamma_m^{SU} \Pi_{n \neq m} f(\Theta_{mn}, \gamma_n^{SU}).$$

23. The radio access node of claim 16, wherein estimating the MU-MIMO signal quality measurement for the first user comprises being operable to calculate:

$$\gamma_{m,i}^{MU} = \gamma_{m,i}^{SU} \Pi_{n \neq m} \Pi_{j=0}^{N_r - 1} f(\Theta_{u_{m,i} u_{n,j}}, \gamma_{n,j}^{SU})$$

where $\Theta_{u_{m,i} u_{n,j}}$ is the orthogonality factor between the antenna i of the first user and the antenna j of another user and $\gamma_{n,j}^{SU}$ is the SINR of transmit branch of the other users.

24. The radio access node of claim 16, wherein the MU-MIMO signal quality measurement for the first user is used for uplink MU-MIMO transmissions.

25. The radio access node of claim 16, wherein obtaining the SU-MIMO signal quality measurement for the first user comprises being operable to determine an average per receive branch signal quality measurement of the first user.

26. The radio access node of claim 16, wherein estimating the MU-MIMO signal quality measurement for the first user comprises being operable to calculate:

$$\gamma_m^{MU} = \gamma_m^{SU} K_m \Pi_{n \neq m} f(\Theta_{mn}, \gamma_m^{SU})$$

where $K_m$ represents a power sharing ratio.

27. The radio access node of claim 16, wherein estimating the MU-MIMO signal quality measurement for the first user comprises being operable to calculate:

$$\gamma_{m,i}^{MU} = \gamma_{m,i}^{SU} K_m \Pi_{n \neq m} \Pi_{j \in \{0,1,\ldots,N_{r-1}\}} f(\Theta_{u_{m,i} u_{n,j}}, \gamma_m^{BRANCH})$$

where $K_m$ represents a power sharing ratio.

28. The radio access node of claim 16, wherein the MU-MIMO signal quality measurement for the first user is used for downlink MU-MIMO transmissions.

29. The radio access node of claim 16, wherein each user is a wireless device.

30. The radio access node of claim 16, wherein the radio access node is a New Radio Base Station, gNB.

31. A radio access node adapted to:
  obtain a Single-User Multiple Input Multiple Output, SU-MIMO, signal quality measurement for at least a first user and an additional user;
  obtain an indication of orthogonality between a channel of the first user and a channel of the additional user; and
  estimate a Multi-User MIMO, MU-MIMO, signal quality measurement for the first user as if the first user and the additional user are paired with each other for a potential MU-MIMO transmission based on the SU-MIMO signal quality measurement for the first user and the additional user and the indication of orthogonality, wherein estimating the MU-MIMO signal quality measurement for the first user comprises successively removing from the SU-MIMO signal quality measurement for the first user a SINR penalty of the additional user based on the indication of orthogonality between the channel of the first user and the channel of the additional user.

* * * * *